United States Patent
Shin

(10) Patent No.: US 11,228,790 B2
(45) Date of Patent: Jan. 18, 2022

(54) PROVIDING TIME SLICE VIDEO

(71) Applicant: KT Corporation, Seongnam-si (KR)

(72) Inventor: Hyoung Chul Shin, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/205,377

(22) Filed: Nov. 30, 2018

(65) Prior Publication Data

US 2020/0177928 A1    Jun. 4, 2020

(51) Int. Cl.
*H04N 21/218* (2011.01)
*G06K 9/00* (2006.01)
(Continued)

(52) U.S. Cl.
CPC ... *H04N 21/21805* (2013.01); *G06K 9/00744* (2013.01); *G06K 9/00765* (2013.01);
(Continued)

(58) Field of Classification Search
CPC ................................................ H04N 21/21805
See application file for complete search history.

(56) References Cited

U.S. PATENT DOCUMENTS

2006/0028489 A1\* 2/2006 Uyttendaele .......... G06T 15/205
345/646
2006/0031915 A1\* 2/2006 Winder .................. H04N 19/46
725/135
(Continued)

FOREIGN PATENT DOCUMENTS

JP    2011182160 A    9/2011
JP    2014126906 A    7/2014
(Continued)

OTHER PUBLICATIONS

Kinexon, "Player and Ball Tracking," Intel, available at https://www.youtube.com/watch?v=Nu3ovl1xZ3s, May 11, 2018.\*
(Continued)

*Primary Examiner* — Michael J Hess
(74) *Attorney, Agent, or Firm* — Hamre, Schumann, Mueller & Larson, P.C.

(57) ABSTRACT

A time slice video providing server includes a video transmission unit configured to transmit, to a user device, any video requested to be played from among multiple videos recorded by multiple cameras; a request unit configured to receive, from the user device, a request to generate a time slice video of a subject shown in the transmitted video; a coordinate extraction unit configured to extract center coordinates of the selected subject based on coordinate information of the subject and positional relationship information of the multiple cameras; a field of view selection unit configured to select a field of views for the multiple videos based on the extracted center coordinates; a field of view correction unit configured to correct each of the selected field of views based on a positional relationship between each of the selected field of views and a video region shown in a corresponding one of the multiple videos; and a time slice video providing unit configured to extract images from the respective multiple videos according to the corrected field of views, generate a time slice video using the extracted images, and provide the generated time slice video to the user device.

17 Claims, 18 Drawing Sheets

(51) Int. Cl.
*H04N 21/845* (2011.01)
*H04N 21/81* (2011.01)
*G11B 27/031* (2006.01)
*H04N 21/4725* (2011.01)
*H04N 21/6587* (2011.01)
*H04N 21/4728* (2011.01)
*H04N 21/4402* (2011.01)

(52) U.S. Cl.
CPC ... *G11B 27/031* (2013.01); *H04N 21/440245* (2013.01); *H04N 21/4725* (2013.01); *H04N 21/4728* (2013.01); *H04N 21/6587* (2013.01); *H04N 21/816* (2013.01); *H04N 21/8456* (2013.01)

(56) References Cited

U.S. PATENT DOCUMENTS

| | | | | |
|---|---|---|---|---|
| 2009/0284601 | A1* | 11/2009 | Eledath | G06K 9/209 348/157 |
| 2015/0193982 | A1* | 7/2015 | Mihelich | H04W 4/026 345/633 |
| 2015/0319424 | A1* | 11/2015 | Haimovitch-Yogev | H04N 21/21805 348/48 |
| 2017/0178515 | A1* | 6/2017 | Brune | G05D 1/0094 |
| 2017/0296868 | A1* | 10/2017 | Bentley | A63F 13/06 |
| 2018/0007444 | A1* | 1/2018 | Li | G11B 27/102 |
| 2019/0196513 | A1* | 6/2019 | Zhou | B64C 39/024 |
| 2019/0287302 | A1* | 9/2019 | Bhuruth | G06F 3/04847 |

FOREIGN PATENT DOCUMENTS

| | | |
|---|---|---|
| KR | 1020070000994 A | 1/2007 |
| KR | 1020140121107 A | 10/2014 |
| KR | 101639275 B1 | 7/2016 |
| KR | 1020180047877 A | 5/2018 |
| KR | 1020190019407 | 2/2019 |

OTHER PUBLICATIONS

Intel, "360-degree replay at MLB All-Star Game," Jul. 22, 2016, available at https://www.youtube.com/watch?v=NhVrfFlqtn4.*
Intel, "Intel freeD Technology + NFL," Dec. 8, 2017, available at https://www.youtube.com/watch?v=J7xIBoPr83A.*
Kinexon, "Player and Ball Tracking," available at https://www.youtube.com/watch?v=JFVAy_uC0V4 May 11, 2018.*
Intel, "INTEL 360-Degree Replay Technology," Intel, available at https://www.youtube.com/watch?v=Nu3ovl1xZ3s, Dec. 8, 2017.*

* cited by examiner

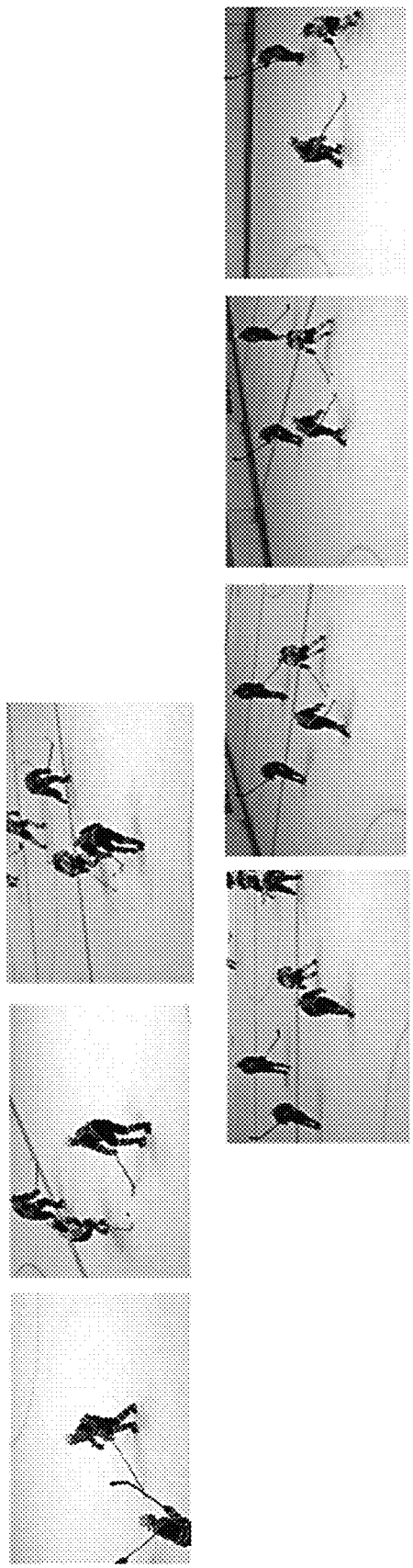

PROVIDING TIME SLICE VIDEO

TECHNICAL FIELD

The present disclosure relates to technologies for providing a time slice video.

BACKGROUND

Time slice techniques refer to imaging technologies by which multiple cameras face a subject from various angles and simultaneously take photos of the subject, and the photos are digitally connected, thereby making a standstill image of the subject appear as if it was captured with a movie camera. A time slice shows the subject in 3D while also an appearance that transcends time and space.

In recent years, time slice videos have become a staple during sports broadcasts, particularly more high-profile events such as playoff or championship games or matches. By providing a multi-view detailed image, it is now possible to analyze and comment in detail about aspects of the game being broadcast. However, for lower-profile broadcast events, e.g., regular season games or events or non-championship-level matches, lower-quality time slice videos are often produced due to fewer video resources and because a point during the action at which time slice techniques are to be applied need to be pre-selected by a time slice video producer. Thus, since events occur randomly in a sporting event, it has been difficult to predict a point in the action at which a notable event will occur for which application of time-slice techniques would be preferred.

SUMMARY

During broadcast sporting events, the action occurs randomly, and, thus, it is difficult for broadcast producers to assign time slice resources to a particular area in anticipation of action-of-interest to occur there. In this regard, the solutions described in the present disclosure pertain to a server, a method, a user device, programs, and applications capable of providing, in real-time, a time slice video that may be applied to a sports broadcast. The technologies described and recited herein enable a user to directly select a subject by touching a display screen or by clicking a mouse and receiving a time slice video of the selected subject. The technologies described and recited herein include generating a time slice video of a subject by correcting a field of view if it is difficult to generate a time slice video of the subject, although problems solved by the present disclosure are not limited to those described above.

According to an exemplary embodiment, a time slice video providing server may include a video transmission unit configured to transmit, to a user device, any video requested to be played by the user device from multiple videos recorded by multiple cameras; a request unit configured to receive, from the user device, a request to generate a time slice video of a subject selected by the user device based on the transmitted video; a coordinate extraction unit configured to extract center coordinates of the selected subject based on coordinate information of the subject of the video being played as well as positional relationship information of the multiple cameras; a field of view selection unit configured to select field of views for the multiple videos based on the extracted center coordinates; a field of view correction unit configured to correct each of the selected field of views based on a positional relationship between each of the selected field of views and a video region that a corresponding one of the multiple videos shows; and a time slice video providing unit configured to extract images from the respective multiple videos according to the corrected field of views, generate a time slice video using the extracted images, and provide the generated time slice video to the user device.

According to another exemplary embodiment, a user device that provides a time slice video may include a request unit configured to request any one of multiple videos recorded by multiple cameras to a time slice video providing server; a video receiving unit configured to receive the requested video from the time slice video providing server; a video play unit configured to play the received video; a subject selection unit configured to receive selection of a subject of the video being played; and a time slice video play unit configured to request generation of a time slice video of the selected subject to the time slice video providing server, receive the time slice video, and play the received time slice video. The time slice video is generated using each image extracted from the multiple videos according to field of views, the field of views are selected for the multiple videos based on center coordinates extracted for the selected subject, the selected field of views are corrected based on a positional relationship between the selected field of views and video regions that corresponding one of the multiple videos shows, and the center coordinates are extracted based on coordinate information of the selected subject of the video being played and positional relationship information of the multiple cameras.

According to another exemplary embodiment, a method for providing a time slice video to be performed by a time slice video providing server may include transmitting, to a user device, any video requested to be played by the user device from multiple videos recorded by multiple cameras; receiving, from the user device, a request to generate a time slice video of a subject selected by the user device from the transmitted video; extracting center coordinates of the selected subject based on coordinate information of the selected subject of the video being played as well as positional relationship information of the multiple cameras; selecting a field of views for the multiple videos based on the extracted center coordinates; correcting each of the selected field of views based on a positional relationship between each of the selected field of views and a video region that a corresponding one of the multiple videos shows; extracting images from the respective multiple videos according to the corrected field of views; generating a time slice video using the extracted images; and providing the generated time slice video to the user device.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described embodiments of the present disclosure, During broadcast sporting events, the action occurs randomly, and, thus, it is difficult for broadcast producers to assign time slice resources to a particular area in anticipation of action-of-interest to occur there, but the solutions described and recited herein may provide a time slice video which may be applied to a real-time broadcast of a sporting event. The solutions described herein include, but are not limited to, a server, a method, a user device, programs, and applications that may enable a user to directly select a subject by touching a display screen or by clicking a mouse and receiving a time slice video of the selected subject on a corresponding device. The solutions described and recited herein include generating a time slice video of a subject by correcting a field of view if it is difficult to generate a time slice video of the subject.

BRIEF DESCRIPTION OF THE DRAWINGS

In the detailed description that follows, embodiments are described as illustrations only, since various changes and modifications will become apparent to those skilled in the art from the following detailed description. The use of the same reference numbers in different figures indicates similar or identical items.

FIG. 6A to FIG. 6C are example display depictions to explain a process of selecting a field of view for multiple videos based on center coordinates, in accordance with various embodiments described herein.

DETAILED DESCRIPTION

Figure 1:
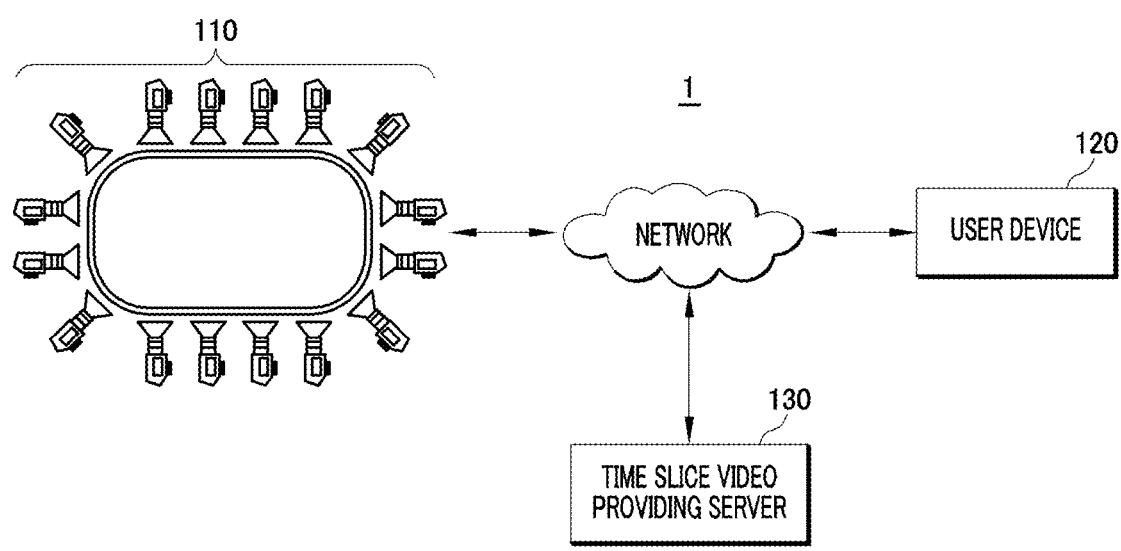
FIG. 1 is an illustration of an example of a time slice video providing system, in accordance with various embodiments described herein.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereafter, an exemplary embodiment of the present disclosure will be described in detail with reference to the accompanying drawings.

FIG. 1 is an illustration of an example of a time slice video providing system in accordance with at least one embodiment described herein. Referring to FIG. 1, a time slice video providing system 1 may include multiple cameras 110, a user device 120, and a time slice video providing server 130. The multiple cameras 110, the user device 120, and the time slice video providing server 130 are illustrated as exemplary components that may be controlled by the time slice video providing system 1.

The components of the time slice video providing system 1 illustrated in FIG. 1 are typically connected through a network. For example, as illustrated in FIG. 1, the time slice video providing server 130 may be connected to any one or more of the multiple cameras 110 and the user device 120.

The network refers to a connection structure that enables the exchange of information between nodes one or more of multiple cameras 110, user device 120, and time slice video providing server 130. Examples of the network may include 3G, 4G, 5G, LTE (Long Term Evolution), WIMAX (World Interoperability for Microwave Access), Wi-Fi, Bluetooth, Internet, LAN (Local Area Network), Wireless LAN (Wireless Local Area Network), WAN (Wide Area Network), WWW (World Wide Web), PAN (Personal Area Network), VLC (Visible Light Communication), LiFi, and the like, but are not limited thereto.

Each of multiple cameras 110 may be utilized to capture in real-time, i.e., broadcast, and/or record at least portions of a sporting event or a live-action performance of other genres in an arena, stadium, theater, etc; and to transmit the captured or recorded video to the time slice video providing server 130. In an example configuration, multiple cameras 110 may be positioned with an arena, stadium, theater, etc., with a predetermined space therebetween.

The user device 120 may transmit to the time slice video providing server 130 a request to play any one of the multiple videos, or portions thereof, captured or recorded by the multiple cameras 110, and receive the requested video from the time slice video providing server 130.

The user device 120 may play the received video, and receive the corresponding user's selection of any subject shown in the video being played. The user device 120 may then transmit the user's request to generate a time slice video of the selected subject to the time slice video providing server 130. The user device 120 may transmit the request to generate a time slice video of the selected subject together with frame information, a camera viewpoint, and 2D coordinate information of the selected subject to the time slice video providing server 130.

The user device 120 may receive and play a time slice video from the time slice video providing server 130. The user device 120 may receive the time slice video together with information about a corrected field of view and information regarding regions cropped from the multiple videos from the time slice video providing server 130.

The time slice video providing server 130 may transmit, to the user device 120, any one video corresponding to the play request from among the multiple videos recorded by one or more of the multiple cameras 110.

The time slice video providing server 130 may receive, from the user device 120, the request to generate a time slice video of the subject selected from the transmitted video, as transmitted from the user device 120. The time slice video providing server 130 may receive, from the user device 120, the request to generate a time slice video along with the frame information, the camera viewpoint, and the 2D coordinate information of the selected subject.

The time slice video providing server 130 may extract center coordinates of the selected subject based on coordinate information of the subject selected from the video being played as well as positional relationship information of the multiple cameras 110.

The time slice video providing server 130 may select field of views for the multiple videos based on the extracted center coordinates. For example, the time slice video providing server 130 may derive coordinate information of the subject from video received from each camera by projecting the center coordinates onto the multiple videos and then select field of views having a predetermined size for each video based on the derived coordinate information.

The time slice video providing server 130 may correct each of the selected fields of view based on a positional relationship between each of the selected field of views and a video region shown by a corresponding one of multiple videos.

That is, the time slice video providing server 130 may determine whether or not it is possible to set a field of view depending on a deviation ratio of the selected field of view from a video region of each video, and may correct the selected field of view for each video based on the determination. For example, if the deviation ratio of the selected field of view from the video region does not exceed a predetermined ratio, the time slice video providing server 130 may reset coordinate information of the subject according to the field of view deviated from the video region to correct the selected field of view to be included in the video region. For another example, if the deviation ratio of the selected field of view from the video region exceeds the predetermined ratio, the time slice video providing server 130 may determine that it is impossible to set a field of view.

The time slice video providing server 130 may further correct the selected field of view to display the subject of a uniform size in each of multiple videos based on positional relationship information of the multiple cameras 110 and a distance between the center coordinates.

The time slice video providing server 130 may extract images from the respective multiple videos according to the corrected field of view, and generate a time slice video using the extracted images. The time slice video providing server 130 may crop the selected field of view from each video and adjust the cropped field to a predetermined size to generate a time slice video. For example, if the field of view is corrected, when the number of consecutive videos for which a field of view can be set among the multiple videos is equal to or higher than a threshold value, the time slice video providing server 130 may generate a time slice video using images extracted from the videos for which a field of view can be set.

The time slice video providing server 130 may provide the generated time slice video to the user device 120. Herein, the time slice video providing server 130 may provide the generated time slice video together with information about the corrected field of view and information about the regions cropped from the respective multiple videos to the user device 120.

Figure 2:
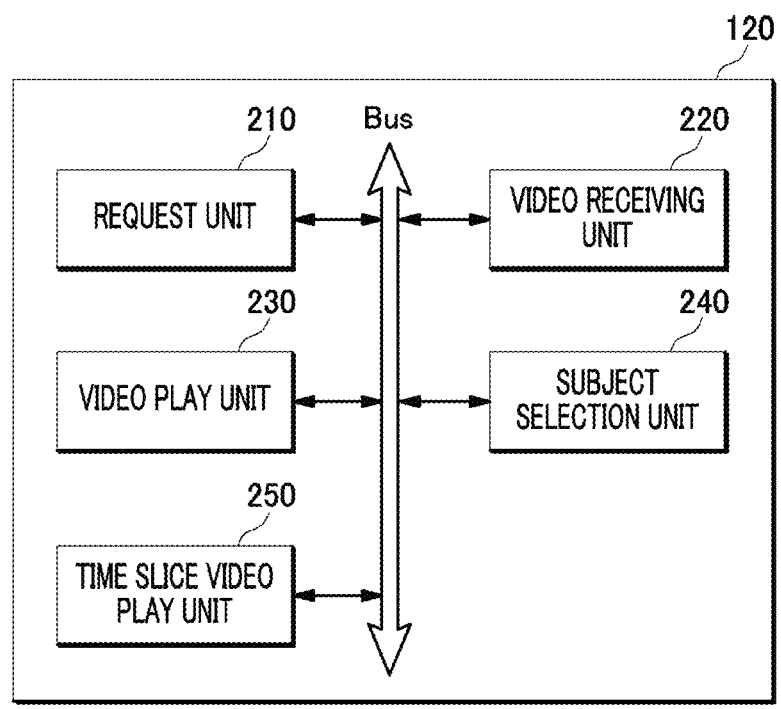
FIG. 2 is a block diagram illustrating an example of a user device, in accordance with various embodiments described herein.

FIG. 2 is a block diagram illustrating an example of a user device, in accordance with at least one embodiment described herein. As shown in the example of FIG. 2, the user device 120 may include a request unit 210, a video receiving unit 220, a video play unit 230, a subject selection unit 240, and a time slice video play unit 250.

The request unit 210 may be configured to transmit a request to play any one of multiple videos recorded by one or more of the multiple cameras 110 to the time slice video providing server 130. The multiple videos recorded by the multiple cameras 110 may be, for example, multi-view videos recorded in a stadium, arena, or theater, although such example venues are not intended to be limiting.

The video receiving unit 220 may be configured to receive and play the requested video from the time slice video providing server 130.

The subject selection unit 240 may be configured to receive a user's selection of a subject of the video being played. That is, the subject selection unit 240 may be configured to receive a user's selection of any one of multiple subjects shown in the received video, based on a touch input by the user or by some other selection mechanism, e.g., mouse.

The time slice video play unit 250 be configured to may transmit, to the time slice video providing server 130, a request to generate a time slice video of the selected subject. When the time slice video play unit 250 transmits the request to the time slice video providing server 130, the transmission may also include frame information, camera viewpoint information, and 2D coordinate information of the selected subject.

The time slice video play unit 250 may further be configured to receive a time slice video from the time slice video providing server 130, in response to the transmitted request. For example, the time slice video play unit 250 may receive information about a corrected field of view and information about regions cropped from the multiple videos from the time slice video providing server 130.

Figure 3:
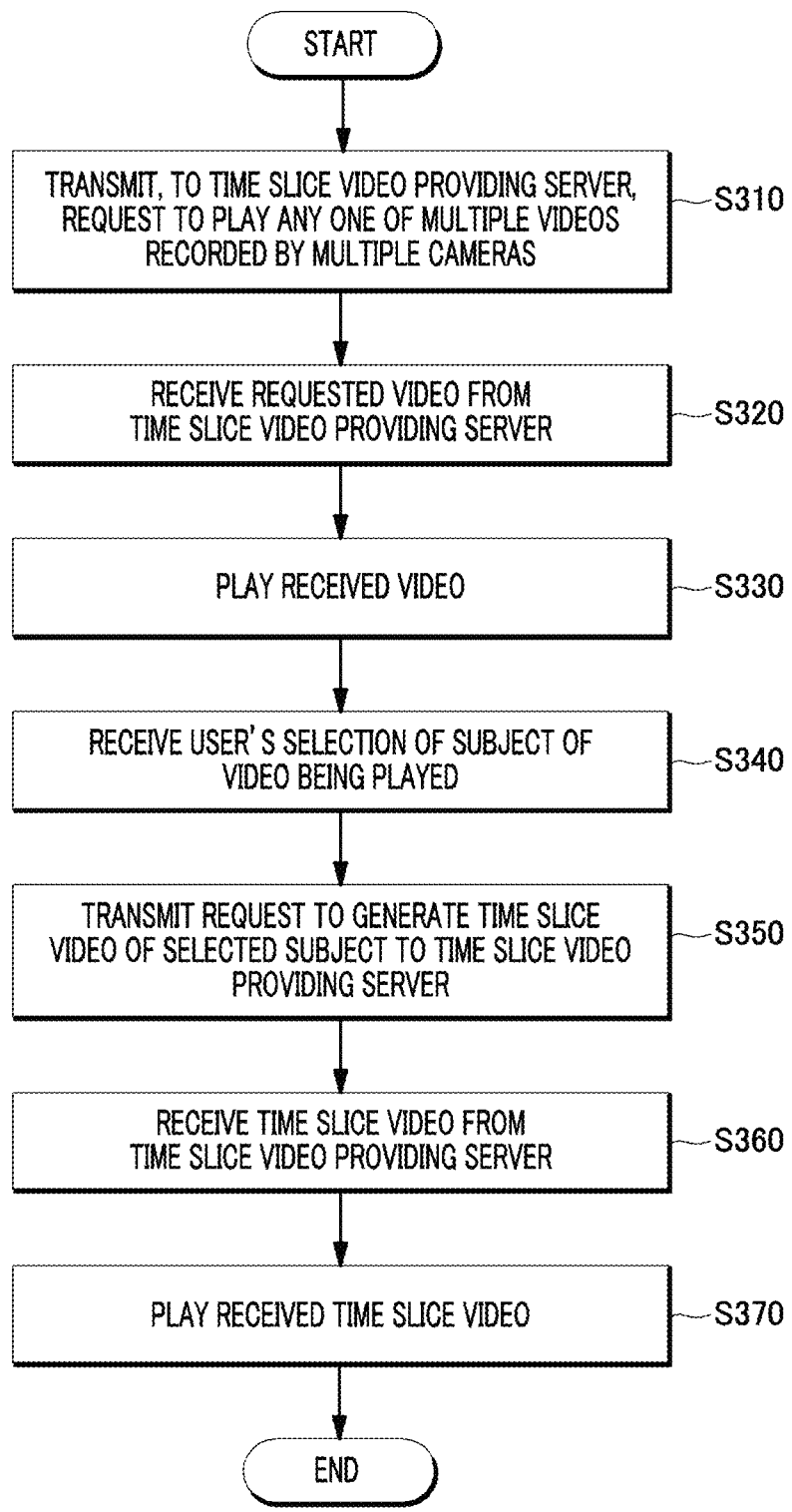
FIG. 3 is a flowchart illustrating an example processing flow for providing a time slice video by a user device, in accordance with various embodiments described herein.

FIG. 3 is a flowchart illustrating an example processing flow for providing a time slice video by a user device, in accordance with at least one embodiment described herein. The processing flow may be performed by some or all components of the user device 120 illustrated in FIG. 3, in accordance with system 1 as shown in, at least, the embodiments illustrated in FIG. 1 and FIG. 2.

In process S310, the user device 120 may transmit, to the time slice video providing server 130, a user's request to play any one of multiple videos recorded by one or more of the multiple cameras 110.

In process S320, the user device 120 may receive the requested video from the time slice video providing server 130.

In process S330, the user device 120 may play the received video.

In process S340, the user device 120 may receive a user's selection of a subject shown in the video being played.

In process S350, the user device 120 may transmit, to the time slice video providing server 130, a request to generate a time slice video of the selected subject.

In process S360, the user device 120 may receive, from the time slice video providing server 130, a time slice video that may be generated using each image extracted from the multiple videos according to field of views that are selected based on center coordinates extracted for the selected subject. The selected field of views may be corrected based on a positional relationship between the selected field of views and video regions shown in a corresponding one of the multiple videos. The center coordinates may be extracted based on coordinate information of the selected subject and positional relationship information of the multiple cameras 110.

In a process S370, the user device 120 may play the received time slice video.

In the descriptions above, the processes S310 to S370 may be divided into additional processes or combined into fewer processes depending on an exemplary embodiment. In addition, some of the processes may be omitted and the sequence of the processes may be changed if necessary.

Figure 4:
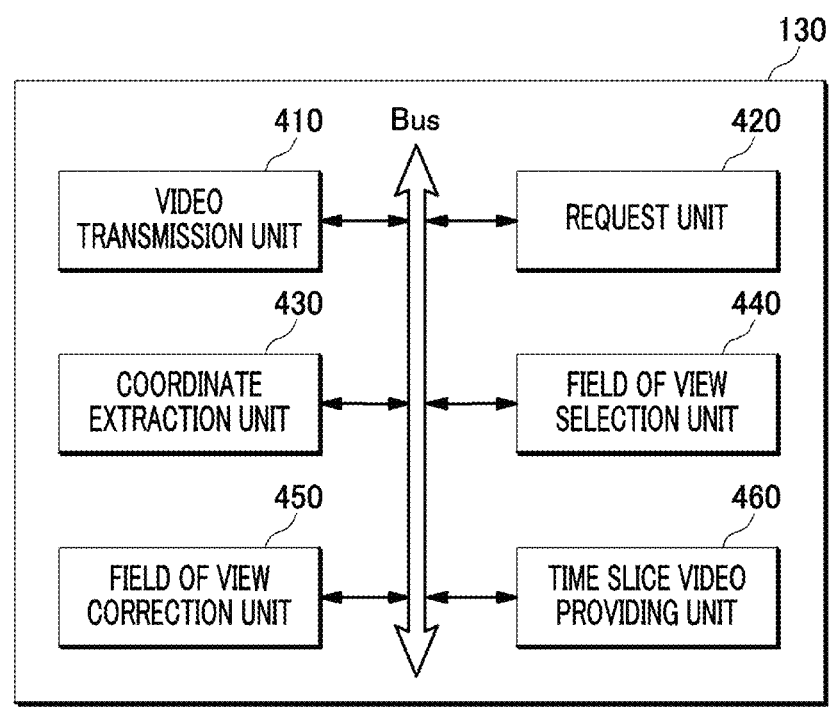
FIG. 4 is a block diagram illustrating an example of a time slice video providing server, in accordance with various embodiments described herein.

FIG. 4 is a block diagram illustrating an example of a time slice video providing server, in accordance with at least one embodiment described herein. As shown in the example of FIG. 4, the time slice video providing server 130 may include a video transmission unit 410, a request unit 420, a coordinate extraction unit 430, a field of view selection unit 440, a field of view correction unit 450, and a time slice video providing unit 460.

The video transmission unit 410 may be configured to transmit, to user device 120, any one video requested to be played from among multiple videos recorded by the multiple cameras 110. The multiple videos recorded by the multiple cameras 110 may be, for example, multi-view videos recorded in an arena, stadium, theater, etc.

The request unit 420 may be configured to receive, from the user device 120, a request to generate a time slice video pertaining to a subject shown in the transmitted video. Along with the request, request unit 420 may also receive frame information, camera viewpoint information, and 2D coordinate information of the selected subject.

The coordinate extraction unit 430 may be configured to extract center coordinates of the selected subject based on coordinate information of the selected subject of the video being played and positional relationship information of the multiple cameras 110.

The field of view selection unit 440 may be configured to select field of views for the multiple videos based on the extracted center coordinates. The field of view selection unit 440 may derive coordinate information of the subject from each video by projecting the center coordinates onto the multiple videos, and select a field of view having a predetermined size for each video based on the derived coordinate information.

The field of view correction unit 450 may be configured to correct each of the selected field of views based on a positional relationship between each selected field of view and a video region shown in a corresponding one of multiple videos.

For example, the field of view correction unit 450 may be configured to determine whether or not it is possible to set a field of view depending on a deviation ratio of the selected field of view from a video region of each video and may correct the selected field of view for each video based on the determination.

The field of view correction unit 450 may be configured to determine whether or not it is possible to set a field of view using the following Equation 1.

If $MW<\text{Threshold}M*FOVW, Rx=Rx+MW$

If $MH<\text{Threshold}M*FOVH, Ry=Ry+MH$ $(0 \leq \text{Threshold}M \leq 1)$ $(0<FOVW \leq W/2, 0<FOVH \leq H/2, W:$ Video horizontal resolution, $H:$ Video vertical resolution$)$ $(-FOVW<MW<FOVW, -FOVH<MH<FOVH)$ [Equation 1]

For example, if the deviation ratio of the selected field of view from the video region does not exceed a predetermined ratio, the field of view correction unit 450 may be configured to reset coordinate information of the subject according to the field of view deviated from the video region to correct the selected field of view to be included in the video region. According to another example, if the deviation ratio of the selected field of view from the video region exceeds the predetermined ratio, the field of view correction unit 450 may be configured to determine that it is impossible to set a field of view.

The field of view correction unit 450 may further be configured to correct the selected field of view to display the subject of a uniform size in each of multiple videos based on positional relationship information of the multiple cameras 110 as well as a distance between the center coordinates.

When a time slice video of a subject is generated, distances between the multiple cameras 110 and the subject have not been considered, and, thus, a time slice video including the subject of different sizes has been provided. Therefore, if the user watches the time slice video of the subject, the immersion level of the user may decrease. As a remedy, the field of view correction unit 450 may further correct the field of view to display the subject of a uniform size by applying the size of the subject to be inversely proportional to the distances between the multiple cameras 110 and the subject based on inverse proportion $$\left(FOV \propto a \cdot \frac{1}{D_t}\right)$$

of the size of the subject to the distances between the multiple cameras 110 and the subject.

The time slice video providing unit 460 may be configured to extract images from the respective multiple videos according to the corrected field of view, generate a time slice video using the extracted images, and provide the generated time slice video to the user device 120. For example, the time slice video providing unit 460 may be configured to crop a field of view selected for each video to be a separate image and adjust the cropped field to a predetermined size to generate a time slice video.

If the field of view is corrected, when the number of consecutive videos for which a field of view can be set among the multiple videos is equal to or higher than a threshold value, the time slice video providing unit 460 may generate a time slice video using images extracted from the videos for which field of views can be set. In this case, the time slice video providing unit 460 may provide the generated time slice video together with information about the corrected field of view and information about the regions cropped from the respective multiple videos to the user device 120.

FIG. 5A to FIG. 5D are example display depictions to explain a process of extracting center coordinates of a subject, in accordance with at least one embodiment described herein.

Figure 5A:
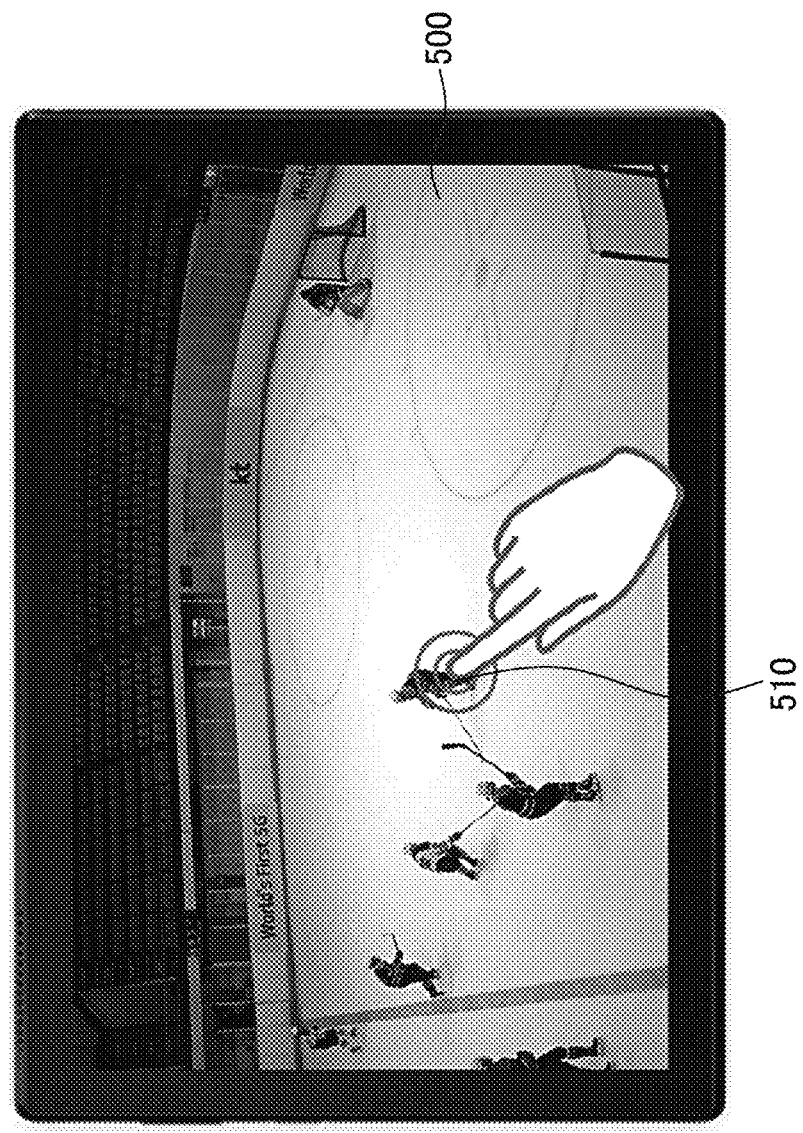
FIG. 5A to FIG. 5D are example display depictions to explain a process of extracting center coordinates of a subject, in accordance with various embodiments described herein.

FIG. 5A illustrates the receiving of a request to generate a time slice video of a subject shown in a video, in accordance with at least one embodiment described herein. While "ice hockey video" 500, recorded by multiple cameras plays, the user device 120 may receive a user's selection of any one subject from among multiple subjects included in the "ice hockey video" 500 being played; and transmits, to time slice video providing server 130, a request to generate a time slice video of the selected subject 510.

Figure 5B:
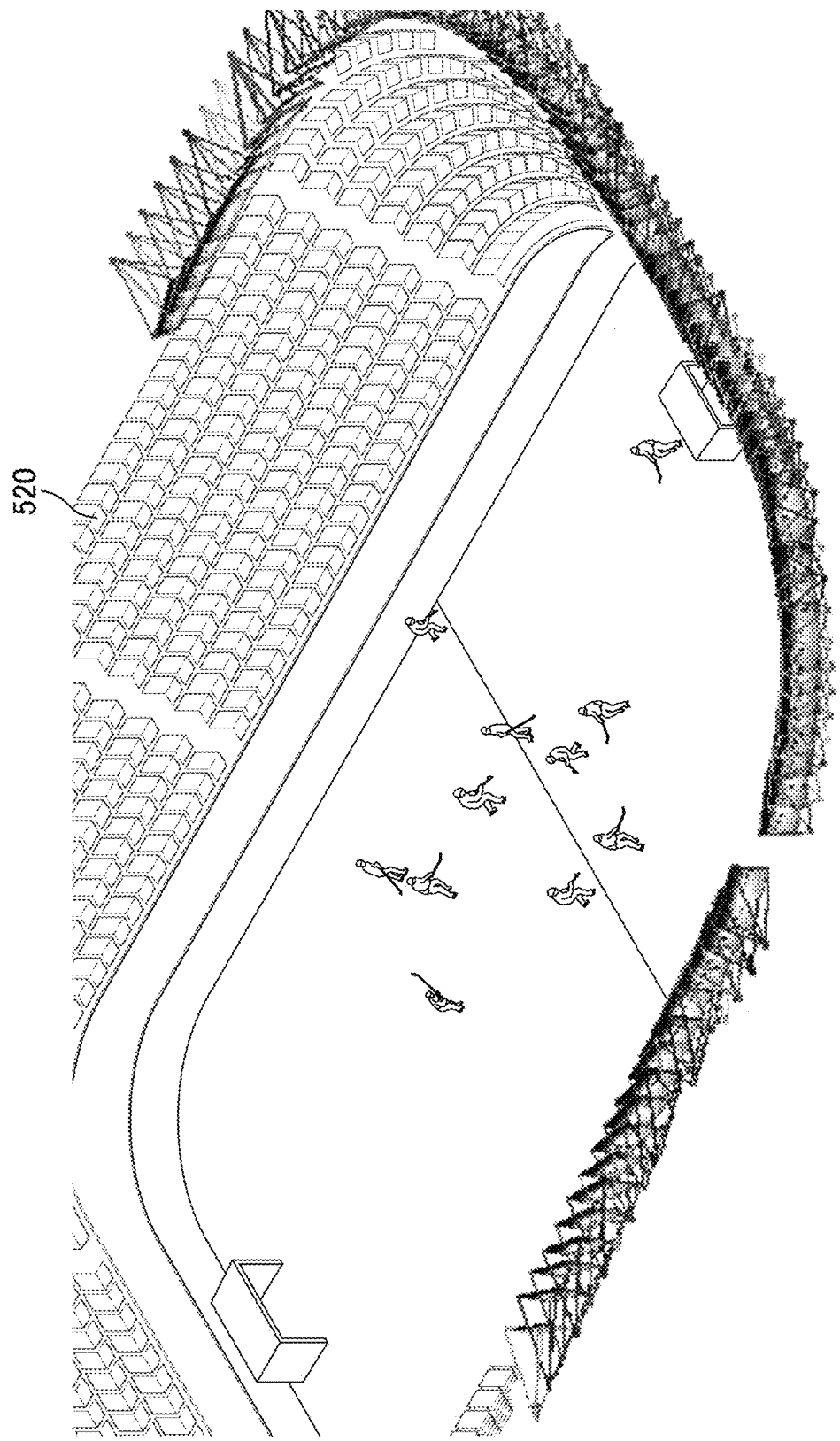

FIG. 5B illustrates real-time modeling of the video playing on a user device, in accordance with at least one embodiment described herein. The time slice video providing server 130 may map 3D coordinates onto a scene from which the subject has been selected by the user device 120 to model 520 the scene in real time.

Figure 5C:
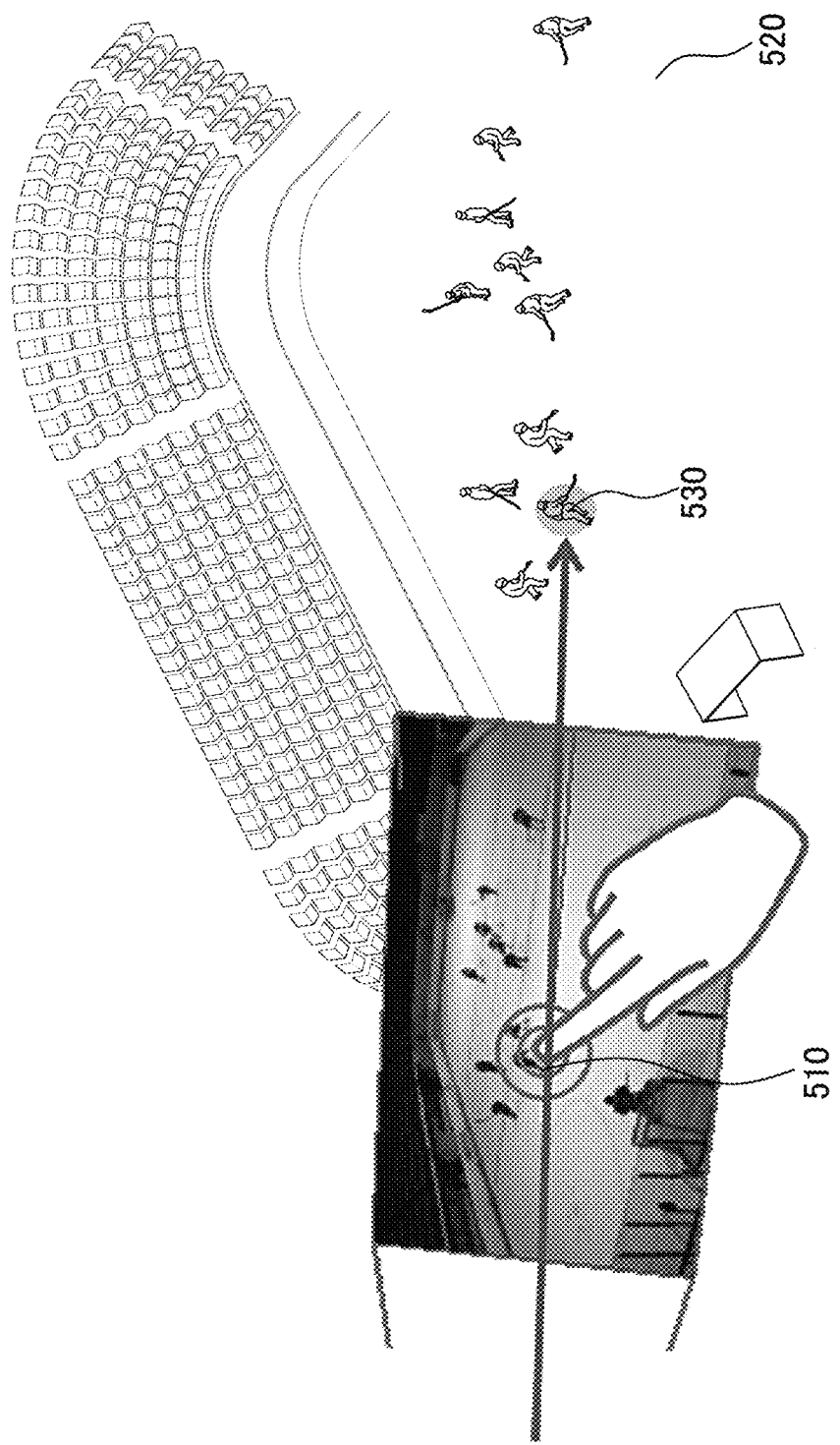

FIG. 5C illustrates mapping of coordinates of the subject selected from the video playinng and the modeled 3D coordinates, in accordance with at least one embodiment described herein. The time slice video providing server 130 may map 3D coordinates 530 where the subject is located in the modeled scene and map 2D coordinates 510 where the subject is located in the scene from which the subject has been selected by the user device 120.

Figure 5D:
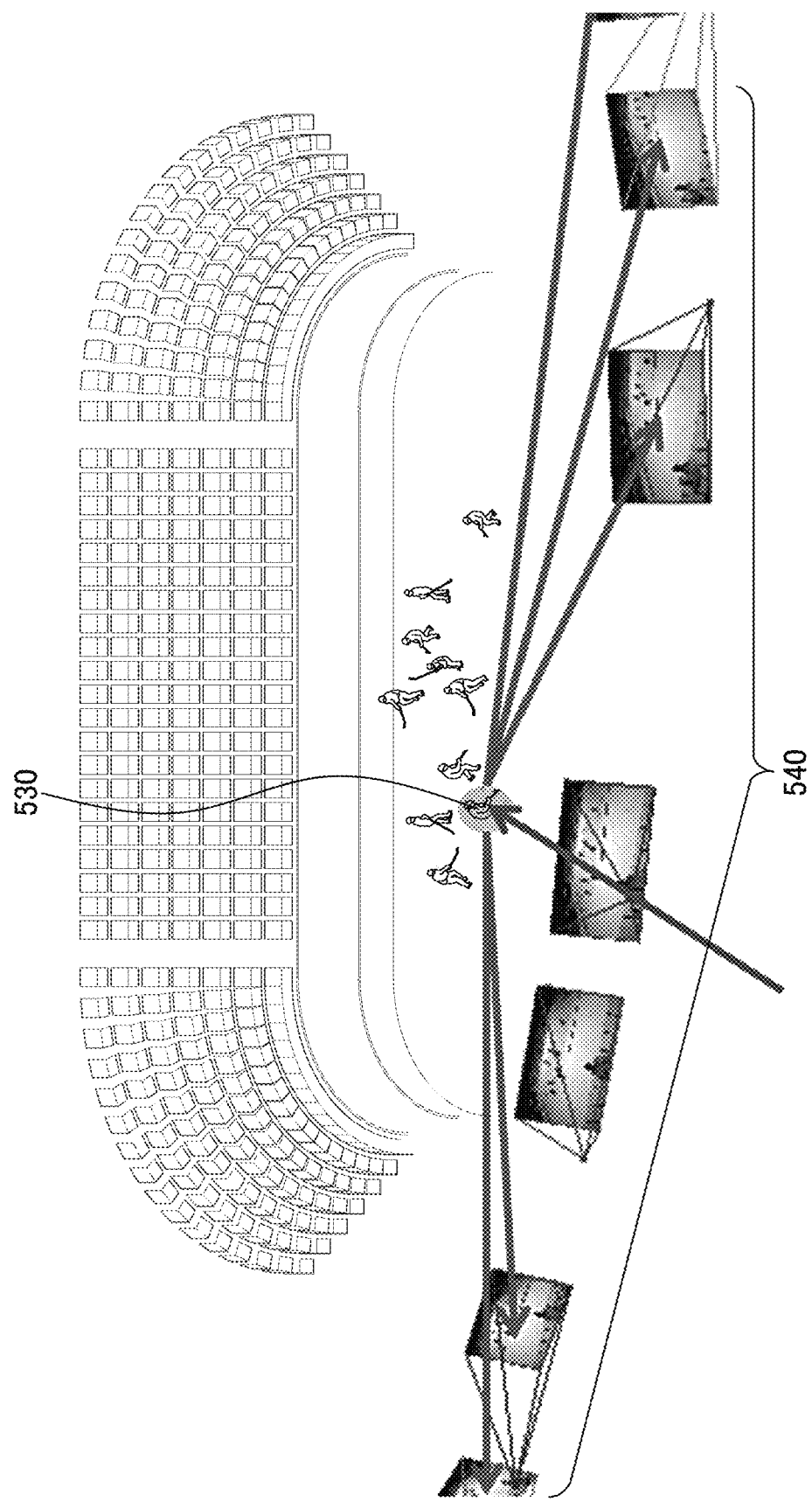

FIG. 5D illustrates extracting center coordinates in accordance with at least embodiment described herein. The time slice video providing server 130 may extract center coordinates of the selected subject based on the mapped coordinate information 530 of the subject and positional relationship information of multiple cameras 540. For example, the time slice video providing server 130 may project the extracted center coordinates of the subject to the multiple videos from different viewpoints to extract center coordinates of the subject from each of the multiple videos.

Figure 6A:
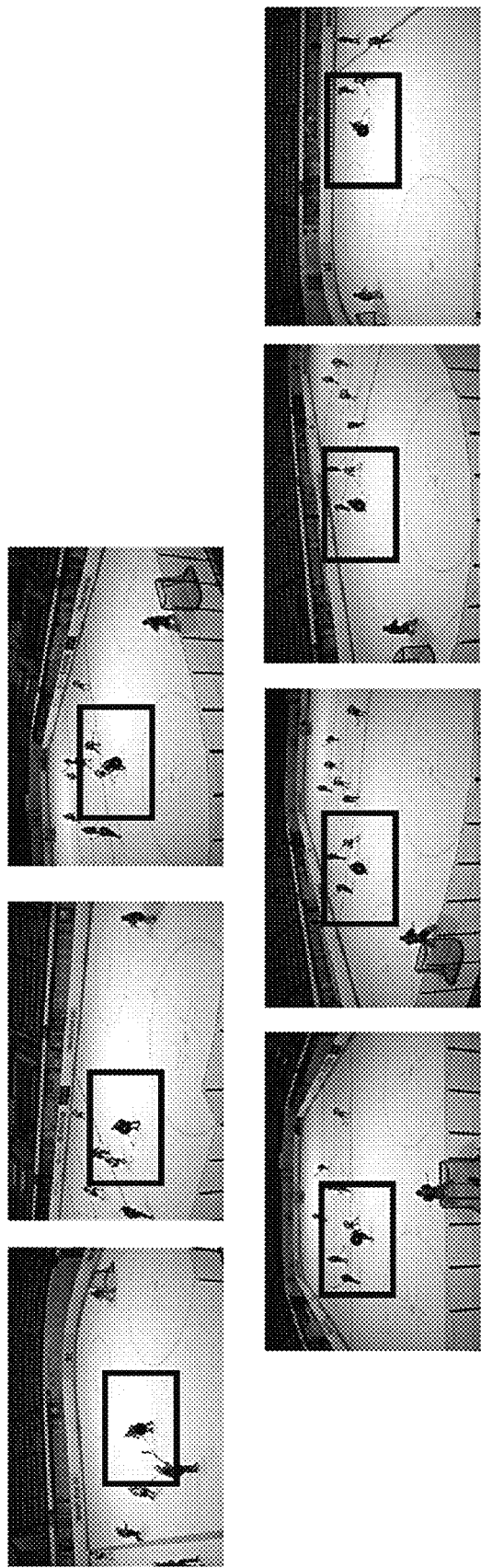
Figure 6B:
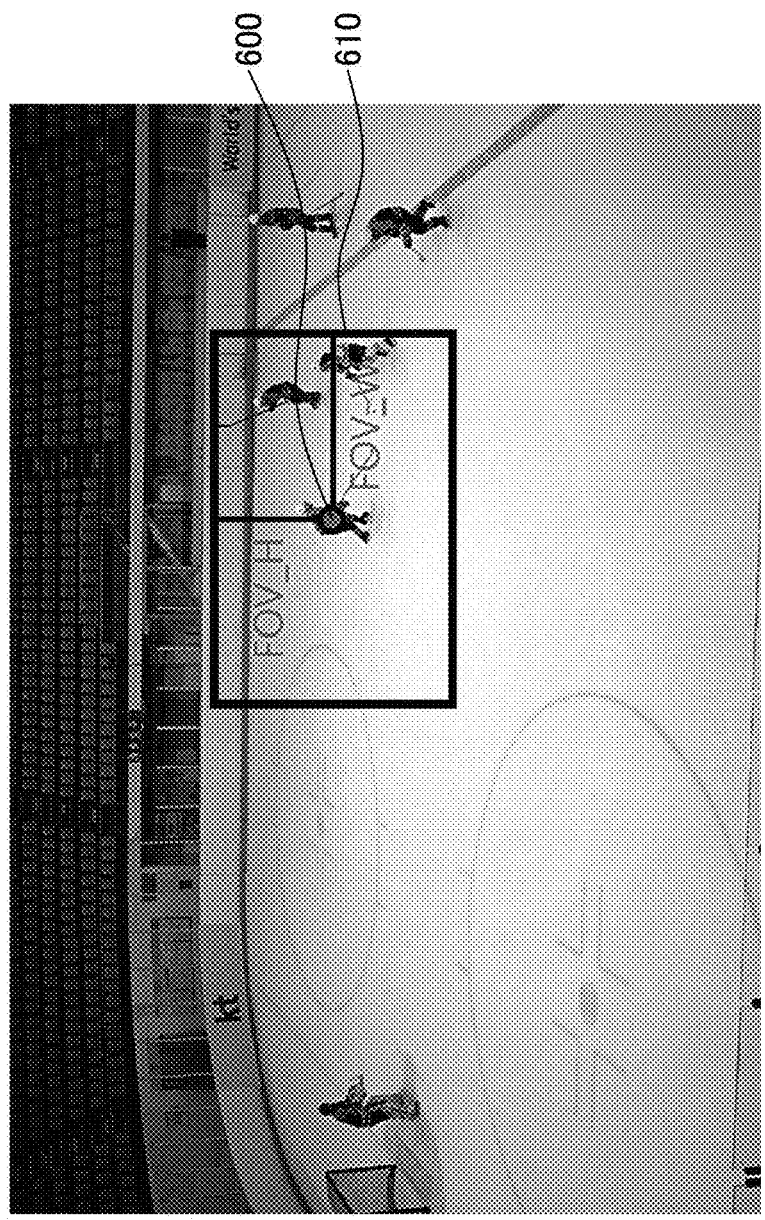

FIG. 6A to FIG. 6C are example display depictions to explain a process of selecting a field of view for multiple videos based on center coordinates, in accordance with an embodiment of the present disclosure.

FIG. 6A illustrates a screen on which a field of view having a predetermined size is selected for each video in accordance with at least one embodiment described herein. Referring to FIG. 6A, the time slice video providing server 130 may derive coordinate information of the subject from each video by projecting the center coordinates onto the multiple videos and selecting a field of view having a predetermined size for each video based on the derived coordinate information.

FIG. 6B illustrates selecting a field of view from any one video in accordance with at least one embodiment described herein. Referring to FIG. 6B, the time slice video providing server 130 may select a field of view having a predetermined size based on the center coordinates of the subject. For example, the time slice video providing server 130 may select upper and lower regions corresponding to "FOV_H" and left and right regions corresponding to "FOV_W" around center coordinates 600 of the subject as a field of view 610.

FIG. 6C illustrates a time slice video generated in accordance with at least one embodiment described herein. The time slice video providing server 130 may crop the selected field of view from each video and adjust the cropped field to a predetermined size to generate a time slice video.

FIG. 7A to FIG. 7D are example display depictions to explain a process of correcting a field of view based on a positional relationship between the field of view and a video region where multiple videos are displayed on a screen, in accordance with various embodiments described herein.

Figure 7A:
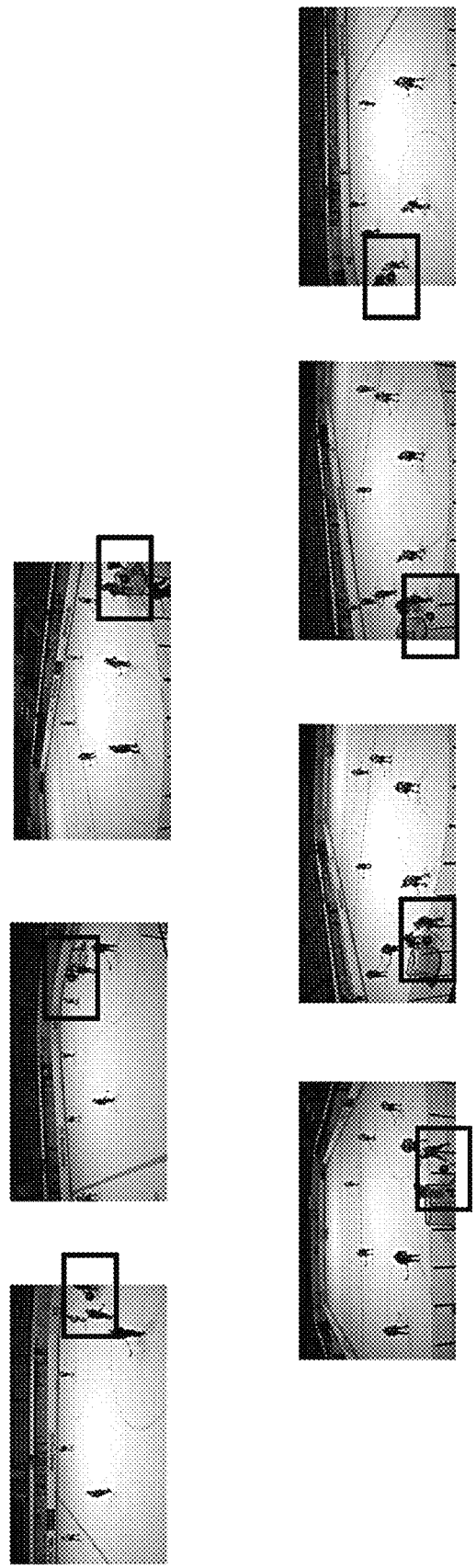
FIG. 7A to FIG. 7D are example display depictions to explain a process of correcting a field of view based on a positional relationship between the field of view and a video region where multiple videos are displayed on a screen in accordance with various embodiments described herein.
Figure 7A:
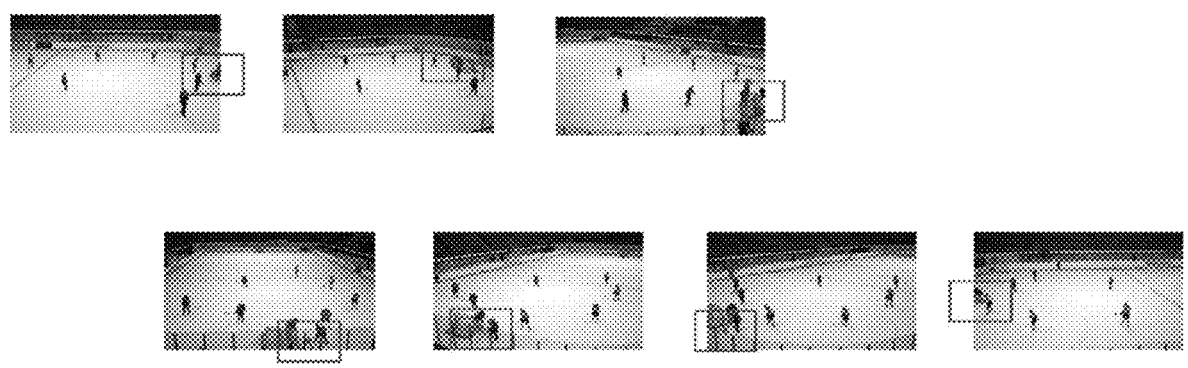

FIG. 7A illustrates a screen on which a field of view deviates from a video region in accordance with at least one embodiment described herein. The time slice video providing server 130 may determine whether it is possible to set a field of view depending on a deviation ratio of the selected field of view from a video region of each video and may correct the selected field of view for each video based on the determination.

Figure 7B:
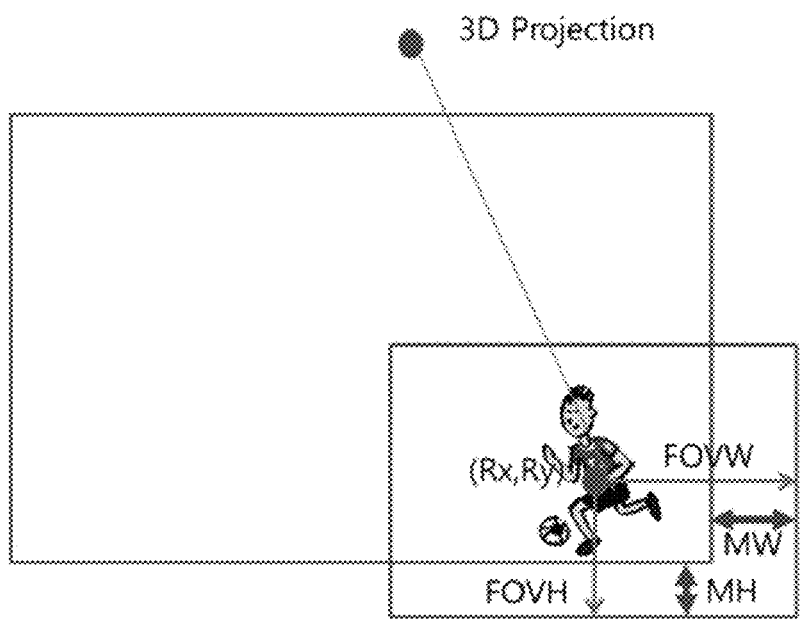
Figure 7C:
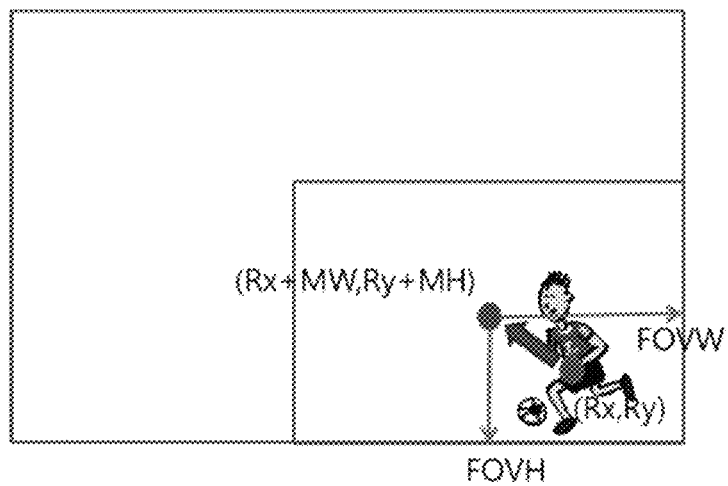

FIG. 7B illustrates correcting a field of view in accordance with at least one embodiment described herein. If the deviation ratio of the selected field of view from the video region does not exceed a predetermined ratio, the time slice video providing server 130 may reset coordinate information of the subject according to the field of view deviated from the video region to correct the selected field of view to be included in the video region. Thus, if the deviation ratio of the selected field of view from the video region exceeds the predetermined ratio, the time slice video providing server 130 may determine that it is impossible to set a field of view. For example, if the coordinates of the subject are (Rx, Ry) and the selected field of view is distant by (MW, MH) from the video region, the time slice video providing server 130 may reflect the distance (MW, MH) to the coordinates of the subject to correct and select the field of view by modifying the coordinates of the subject to (Rx+MW, Ry+MH).

Figure 7D:
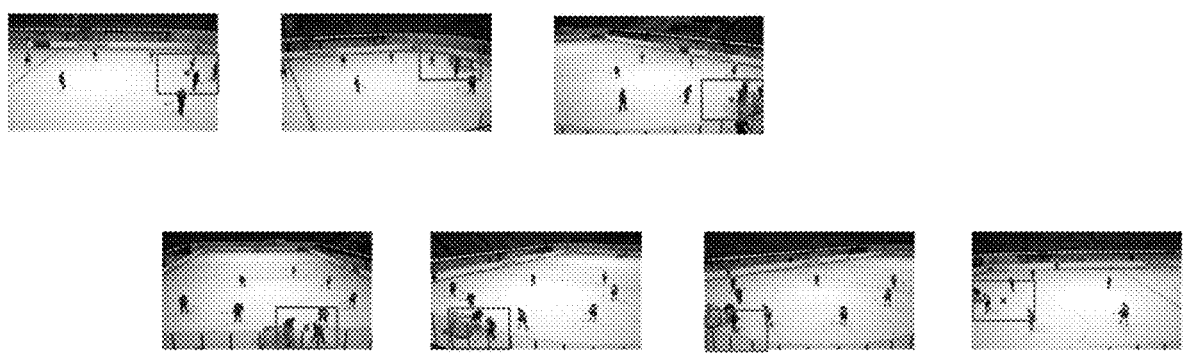

FIG. 7D is a diagram provided to explain the corrected field of view in accordance with at least one embodiment described herein.

Figure 8:
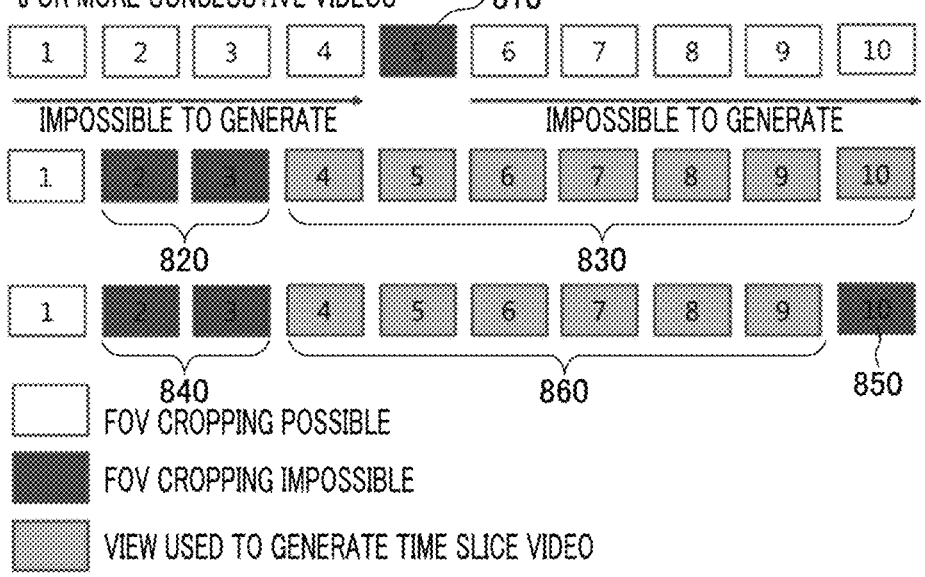
FIG. 8 is an illustration provided to explain a process of generating a time slice video depending on whether the number of consecutive videos for which a field of view can be set among multiple videos is equal to or higher than a threshold value in accordance with various embodiments described herein.

FIG. 8 is an illustration provided to explain a process of generating a time slice video depending on whether the number of consecutive videos for which a field of view can be set among multiple videos is equal to or higher than a threshold value in accordance with at least one embodiment described herein.

Referring to FIG. 8, the time slice video providing server 130 shows a time slice video as consecutive multi-view videos. Therefore, if the number of consecutive videos for which a field of view can be set is equal to or higher than a threshold value after correction of the field of view, a time slice video may be generated; but if the number of consecutive videos is less than the threshold value, a time slice video may not be generated.

For example, it can be assumed that there are videos from a total of 10 viewpoints and a threshold value is set to 6. Thus, if a field of view cannot be set (or cannot be cropped) for a video 810 from a fifth viewpoint, videos from four left viewpoints and five right viewpoints continue with respect to the video 810 from the fifth viewpoint, which means the number of consecutive videos does not reach the threshold value "6", and, thus, the time slice video providing server 130 cannot generate a time slice video. Further to the example, if a field of view cannot be set (or cannot be cropped) for videos 820 from second and third viewpoints, videos 830 from a total of "7" viewpoints including fourth to tenth viewpoints continue, which means the number of consecutive videos is higher than the threshold value "6", and thus, the time slice video providing server 130 can generate a time slice video. Further still, if a field of view cannot be cropped for videos 840 from second and third viewpoints and a video 850 from a tenth viewpoint, videos 860 from a total of "6" viewpoints including fourth to ninth viewpoints continue, which means the number of consecutive videos is equal to the threshold value "6", and thus, the time slice video providing server 130 can generate a time slice video.

Figure 9A:
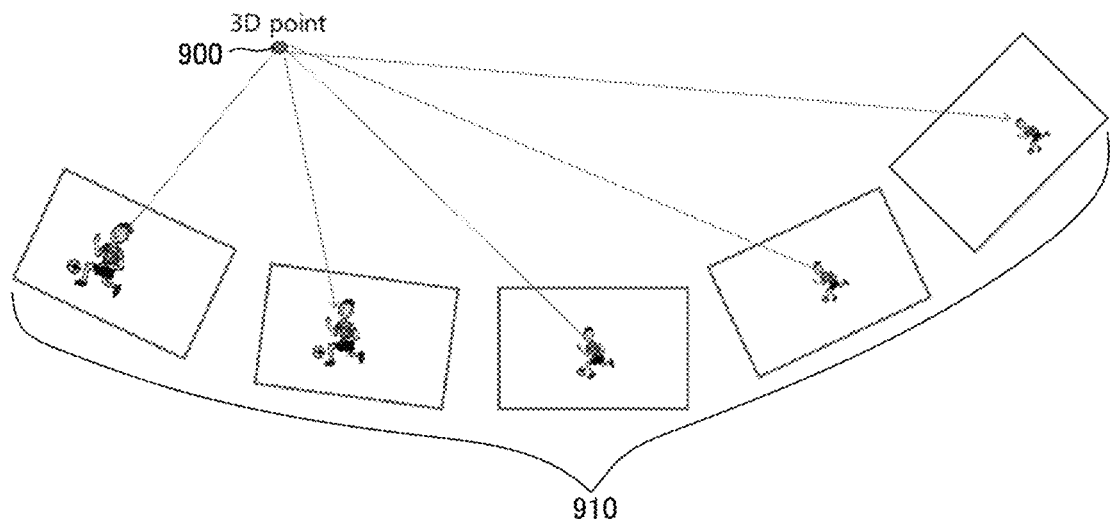
FIG. 9A and FIG. 9B are example depictions to explain a process of correcting a field of view selected to display a subject of a uniform size in each of multiple videos in accordance with various embodiments described herein.
Figure 9B:
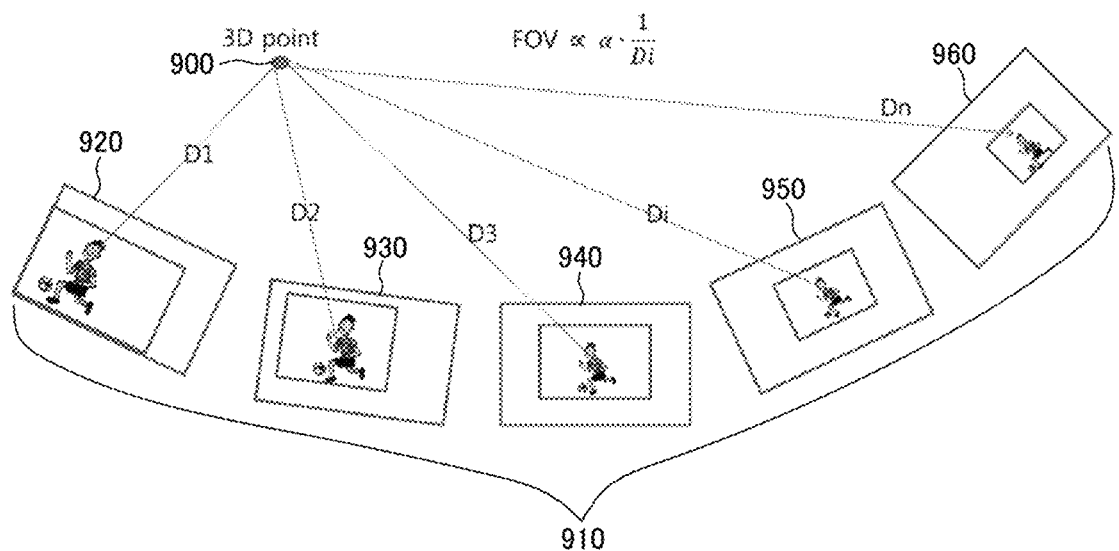

FIG. 9A and FIG. 9B are example depictions to explain a process of correcting a field of view selected to display a subject of a uniform size in each of multiple videos in accordance with at least one embodiment described herein.

FIG. 9A is a diagram illustrating a conventional time slice video of a subject. Referring to FIG. 9A, a conventional time slice video does not reflect distances between center coordinates 900 and multiple cameras 910. Therefore, as the distance of each camera from the center coordinates 900 increases, the size of the subject decreases.

FIG. 9B illustrates a time slice video in which a field of view has been corrected in accordance with at least one embodiment described herein. Referring to FIG. 9B, the size of the subject is inversely proportional to the distance of each camera from the center coordinates 900 of the subject, and thus, the time slice video providing server 130 may correct the field of view by applying the size of the subject to be inversely proportional to the distance of each camera from the center coordinates 900 of the subject. Thus, a time slice video in which the subject of a uniform size can be displayed may be generated.

Figure 10:
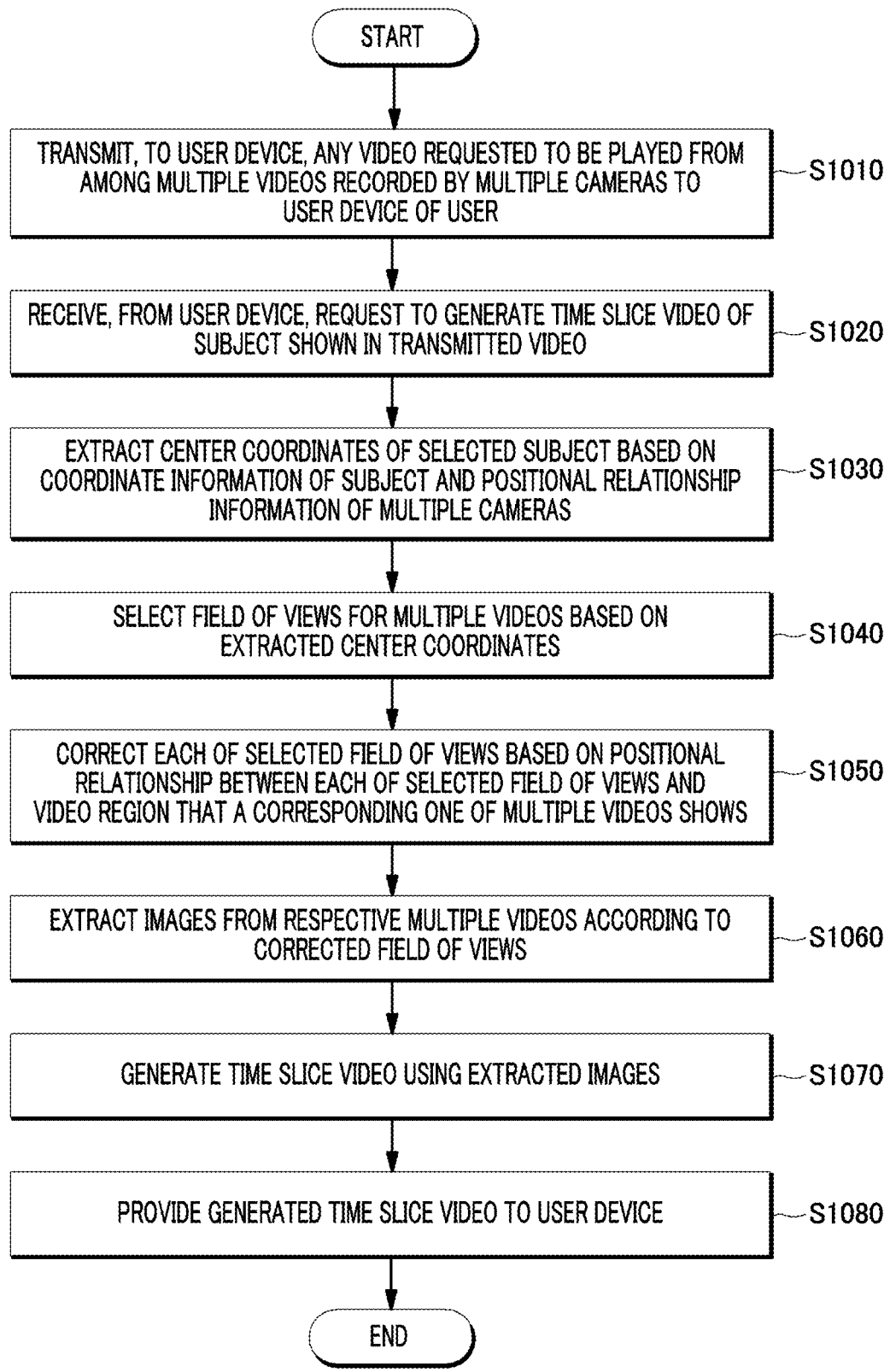
FIG. 10 is a flowchart illustrating an example processing flow for providing a time slice video by a time slice video providing server in accordance with various embodiments described herein.

FIG. 10 is a flowchart showing an example processing flow for providing a time slice video by a time slice video providing server in accordance with at least one embodiment described herein. The processing flow may be performed by the time slice video providing server 130 illustrated in FIG. 4 and includes the processes time-sequentially performed by the time slice video providing system 1 according to the embodiments illustrated in FIG. 1 through FIG. 9B. Therefore, descriptions of the processes performed by the time slice video providing system 1 may be applied to the method for providing a time slice video by the time slice video providing server 130 according to the embodiment illustrated in FIG. 1 to FIG. 9B, even though they are omitted hereinafter.

In process S1010, the time slice video providing server 130 may transmit, to the user device 120, any video requested to be played by the user device 120 from among multiple videos recorded by one or more of the multiple cameras 110.

In process S1020, the time slice video providing server 130 may receive, from the user device 120, a request to generate a time slice video of a subject shown in the transmitted video, as selected by the user device 120.

In process S1030, the time slice video providing server 130 may extract center coordinates of the selected subject based on coordinate information of the selected subject of the video playing and positional relationship information of the multiple cameras 110.

In process S1040, the time slice video providing server 130 may select field of views for the multiple videos based on the extracted center coordinates.

In process S1050, the time slice video providing server 130 may correct each of the selected field of views based on a positional relationship between each of the selected field of views and a video region shown in a corresponding one of multiple videos.

In process S1060, the time slice video providing server 130 may extract images from the respective multiple videos according to the corrected field of views.

In process S1070, the time slice video providing server 130 may generate a time slice video using the extracted images.

In process S1080, the time slice video providing server 130 may provide the generated time slice video to the user device 120.

In the descriptions above, the processes S1010 to S1080 may be divided into additional processes or combined into fewer processes depending on an exemplary embodiment. In addition, some of the processes may be omitted and the sequence of the processes may be changed if necessary.

The method for providing time slice video by the time slice video providing server and the user device described above with reference to FIG. 1 to FIG. 10 can be implemented in a computer program stored in a medium to be executed by a computer or a storage medium including instructions codes executable by a computer. Also, the method for providing time slice video by the time slice video providing server and the user device described above with reference to FIG. 1 to FIG. 10 can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A time slice video providing server, comprising:
a transmitter;
a requester;
an extractor;

a selector;
a corrector; and
a generator,
wherein
the transmitter transmits to a user device a video requested to be played from among multiple videos recorded by multiple cameras;
the requester receives from the user device a request to generate a time slice video of a subject selected by the user device, wherein the subject is shown in the video being played by the user device;
the extractor extracts center coordinates of the selected subject based on coordinate information of the subject and positional relationship information of the multiple cameras;
the selector selects fields of view for the multiple videos based on the extracted center coordinates;
the corrector corrects each of the selected fields of view based on a positional relationship between each of the selected fields of view and a video region that a corresponding one of the multiple videos shows;
the generator comprises a storage medium storing at least one instruction executable by a computer that, when executed, causes the computer to:
extract images from the respective multiple videos according to the corrected fields of view,
re-size each of the extracted images proportionally to a respective distance between the camera, from which the extracted image is taken, and the extracted center coordinates,
generate a time slice video using the re-sized extracted images, and
provide the generated time slice video to the user device; and
the corrector comprises a storage medium storing at least one instruction executable by a computer that, when executed, causes the corrector to:
correct a coordinate of the subject, and
determine whether or not to set a selected field of view depending on a deviation ratio of the selected field of view from a video region of each video, utilizing:

if $MW < \text{Threshold} M * FOVW$, then $Rx = Rx + MW$; and if $MH < \text{Threshold} M * FOVH$, then $Ry = Ry + MH$, wherein (Rx, Ry) represents the coordinate of the subject,
(MW, MH) represents a distance of the selected field of view from the video region to the coordinate of the subject,
FOVW represents a horizontal width of the selected field of view relative to the coordinate of the subject,
FOVH represents a vertical height of the selected field of view relative to the coordinate of the subject, $0 \leq \text{Threshold} M \leq 1$, $0 < FOVW \leq W/2$ and $0 < FOVH \leq H/2$, wherein W represents a horizontal video resolution, and H represents a vertical video resolution, $-FOVW < MW < FOVW$ and $-FOVH < MH < FOVH$, and the deviation ratio is MW/FOVW or MH/FOVH.

2. The time slice video providing server of claim 1, wherein the requester receives at least one of frame information, camera viewpoint information, and 2D coordinate information of the selected subject from the user device.

3. The time slice video providing server of claim 1, wherein the field of view selector derives the coordinate information of the subject from each video by projecting the center coordinates onto the multiple videos and selects a field of view having a desired size for each video based on the derived coordinate information, wherein the desired size is upper and lower regions corresponding to FOVH around the coordinate of the subject and left and right regions corresponding to FOVW around the coordinate of the subject.

4. The time slice video providing server of claim 3, wherein the generator crops the selected field of view from each video and adjusts the cropped field to the desired size to generate the time slice video.

5. The time slice video providing server of claim 1, wherein if the deviation ratio of the selected field of view from the video region does not exceed a desired ratio, the corrector resets the coordinate (Rx, Ry) of the subject according to the field of view deviated from the video region by modifying the coordinate (Rx, Ry) of the subject to (Rx+MW, Ry+MH).

6. The time slice video providing server of claim 5, wherein if the deviation ratio of the selected field of view from the video region exceeds the desired ratio, the corrector does not set the field of view.

7. The time slice video providing server of claim 6, wherein if the number of consecutive videos for which it is possible to set the fields of view from the multiple videos is equal to or greater than a threshold value, the time slice video providing server generates the time slice video using images extracted from the videos for which it is possible to set the fields of view.

8. The time slice video providing server of claim 1, wherein the corrector further corrects the selected field of view to display the subject of a uniform size in each of the multiple videos based on positional relationship information of the multiple cameras and a distance between the center coordinates.

9. The time slice video providing server of claim 4, wherein the generator provides information about the corrected fields of view and information about regions cropped from the multiple videos to the user device.

10. A user device that provides a time slice video, comprising:
a request unit comprising a first storage medium storing at least a first instruction programmed to transmit, to a time slice video providing server, a request to play any one of multiple videos recorded by multiple cameras;
a video receiving unit comprising a second storage medium storing at least a second instruction programmed to receive the requested video from the time slice video providing server;
a video play unit comprising a third storage medium storing at least a third instruction programmed to play the received video;
a subject selection unit comprising a fourth storage medium storing at least a fourth instruction programmed to receive a user's selection of a subject of the video being played; and
a time slice video play unit comprising a fifth storage medium storing at least a fifth instruction programmed to:

transmit a request to generate a time slice video of the subject to the time slice video providing server, receive the time slice video from the time slice video providing server, and play the received time slice video, wherein the time slice video is generated using each image extracted from the multiple videos according to fields of view, and each of the extracted images is re-sized proportionally to a respective distance between the camera, from which the extracted image is taken, and the extracted center coordinates, the fields of view are selected for the multiple videos based on center coordinates extracted for the subject, the selected fields of view are corrected based on a positional relationship between the selected fields of view and video regions that corresponding one of the multiple videos shows, and the center coordinates are extracted based on coordinate information of the subject of the video being played and positional relationship information of the multiple cameras, wherein the correcting selected fields of view includes determining whether or not it is possible to set a field of view depending on a deviation ratio of the field of view from a video region of each video and correcting the field of view for each video based on the following determination:

if $MW<\text{Threshold}M*FOVW$, then $Rx=Rx+MW$; and if $MH<\text{Threshold}M*FOVH$, then $Ry=Ry+MH$, wherein (Rx, Ry) represents a coordinate of the subject, (MW, MH) represents a distance of the field of view from the video region to the coordinate of the subject, FOVW represents a horizontal width of the field of view relative to the coordinate of the subject, and FOVH represents a vertical height of the field of view relative to the coordinate of the subject, $0 \leq \text{Threshold}M \leq 1$, $0<FOVW \leq W/2$ and $0<FOVH \leq H/2$, wherein W represents a horizontal video resolution, and H represents a vertical video resolution, $-FOVW<MW<FOVW$ and $-FOVH<MH<FOVH$, and the deviation ratio is MW/FOVW or MH/FOVH.

11. The user device of claim 10, wherein the time slice video play unit transmits, to the time slice video providing server, at least one of frame information, camera viewpoint information, and 2D coordinate information of the subject.

12. The user device of claim 11, Wherein the time slice video play unit receives, from the time slice video providing server, information about the corrected fields of view and information about regions cropped from the multiple videos.

13. A method for providing a time slice video to be performed by a time slice video providing server, comprising:

transmitting, to a user device, any one video requested to be played by the user device from multiple videos recorded by multiple cameras of the user;

receiving, from the user device, a request to generate a time slice video of a subject selected by the user device from the transmitted video;

extracting center coordinates of the subject based on coordinate information of the subject of the video being played and positional relationship information of the multiple cameras;

selecting a field of view for each of the multiple videos based on the extracted center coordinates;

correcting each of the selected fields of view based on a positional relationship between each of the selected fields of view and a video region shown in a corresponding one of the multiple videos;

extracting images from the respective multiple videos according to the corrected fields of view;

re-sizing each of the extracted images proportionally to a respective distance between the camera, from which the extracted image is taken, and the extracted center coordinates;

generating a time slice video using the re-sized extracted images;

providing the generated time slice video to the user device, and the correcting each of the selected fields of view includes determining whether or not it is possible to set a field of view depending on a deviation ratio of the field of view from a video region of each video and correcting the field of view for each video based on the following determination:

if $MW<\text{Threshold}M*FOVW$, then $Rx=Rx+MW$; and if $MH<\text{Threshold}M*FOVH$, then $Ry=Ry+MH$, wherein (Rx, Ry) represents a coordinate of the subject, (MW, MH) represents a distance of the field of view from the video region to the coordinate of the subject, FOVW represents a horizontal width of the field of view relative to the coordinate of the subject, and FOVH represents a vertical height of the field of view relative to the coordinate of the subject, $0 \leq \text{Threshold}M \leq 1$, $0<FOVW \leq W/2$ and $0<FOVH \leq H/2$, wherein W represents a horizontal video resolution, and H represents a vertical video resolution, $-FOVW<MW<FOVW$ and $-FOVH<MH<FOVH$, and the deviation ratio is MW/FOVW or MH/FOVH.

14. The method for providing a time slice video of claim 13, wherein in the correcting of the selected field of view, if the deviation ratio of the selected field of view from the video region does not exceed a desired ratio, the coordinate (Rx, Ry) of the subject is reset according to the field of view deviated from the video region by modifying the coordinate (Rx, Ry) of the subject to (Rx+MW, Ry+MH).

15. The method for providing a time slice video of claim 14, wherein in the correcting of the selected field of view, if the deviation ratio of the selected fields of view from the video region exceeds the desired ratio, the field of view is not set.

16. The method for providing a time slice video of claim 15, wherein in the generating of the time slice video, if the number of consecutive videos for which it is possible to set the fields of view from the multiple videos is equal to or greater than a threshold value, the time slice video is generated using images extracted from the videos for which it is possible to set the fields of view.

17. The method for providing a time slice video of claim 13, wherein the correcting of the selected field of view includes correcting the selected field of view to display the subject of a uniform size in each of the multiple videos based on positional relationship information of the multiple cameras and a distance between the center coordinates.

* * * * *